(12) United States Patent
Carbone et al.

(10) Patent No.: US 10,254,178 B2
(45) Date of Patent: Apr. 9, 2019

(54) AMBIENT TEMPERATURE ESTIMATION (71) Applicant: Intel Corporation, Santa Clara, CA (US)

(72) Inventors: Mark Carbone, Cupertino, CA (US); Paul Karayacoubian, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1015 days.

(21) Appl. No.: 14/229,805

(22) Filed: Mar. 28, 2014

(65) Prior Publication Data

US 2015/0276509 A1 Oct. 1, 2015

(51) Int. Cl.
*G01K 7/42* (2006.01)
*G01K 1/20* (2006.01)

(52) U.S. Cl.
CPC .............. *G01K 7/42* (2013.01); *G01K 1/20* (2013.01)

(58) Field of Classification Search
CPC .................................. G01K 7/42; G01K 1/20
USPC ......... 374/170, 163, 44, 178, 109, 185, 102; 327/512, 513; 702/130
See application file for complete search history.

(56) References Cited

U.S. PATENT DOCUMENTS

| | | | | |
|---|---|---|---|---|
| 8,311,764 | B1* | 11/2012 | Robillard | G01K 7/427 702/130 |
| 2009/0144014 | A1* | 6/2009 | Aljabari | G01K 1/20 702/130 |
| 2015/0057830 | A1* | 2/2015 | Slaby | G05D 23/1917 700/300 |

OTHER PUBLICATIONS

Bejan, A. & Kraus, A. (2003). Heat Transfer Handbook (pp. 2-3, 164-165 ). Hoboken, NJ: John Wiley & Sons Inc.*
Bejan, A. & Kraus, A. (2003). Heat Transfer Handbook (pp. 264 and 364-371). Hoboken, NJ: John Wiley & Sons Inc.*
Federal Register (2014) , vol. 79, No. 241, p. 74626.*

* cited by examiner

*Primary Examiner* — Lisa Caputo
*Assistant Examiner* — Janice M Soto
(74) *Attorney, Agent, or Firm* — Internatonal IP Law Group, P.L.L.C.

(57) ABSTRACT

Techniques for estimating ambient temperature are described herein. Temperature data may be received from a first sensor of a computing device. Temperature data may be received from a second sensor of a computing device. The ambient temperature may be estimated based on the first temperature data in relation to the second temperature data.

21 Claims, 5 Drawing Sheets

AMBIENT TEMPERATURE ESTIMATION

TECHNICAL FIELD

This disclosure relates generally to ambient temperature estimation. More specifically, the disclosure describes ambient temperature estimation based on multiple sensor data.

BACKGROUND

Computing devices may be used in various conditions. In some scenarios, a mobile computing device, such as a tablet, smartphone, and the like, are configured to operate below a maximum temperature. In many cases, the maximum operating temperature is set by a manufacturer based on a general understanding of comfort of an average user holding the mobile computing device. For example, a manufacturer of a mobile computing device may set a maximum operating temperature at 35 degrees Celsius, regardless of the ambient temperature of the environment within which the mobile computing device is located.

DETAILED DESCRIPTION

The subject matter disclosed herein relates to techniques for estimating ambient temperature. In some cases, computing devices may be handheld devices. For example, mobile computing devices, such as tablet computing devices, all-in-one computing devices, smartphones, and the like, may be held by a user during operation. The temperature of the operating device may increase during use, and in some scenarios, may be related to the ambient temperature. However, mobile computing devices may be sealed without an air inflow from which ambient temperatures may be estimated. Therefore, techniques described herein include estimating ambient temperature of an external environment of a computing device.

Figure 1:
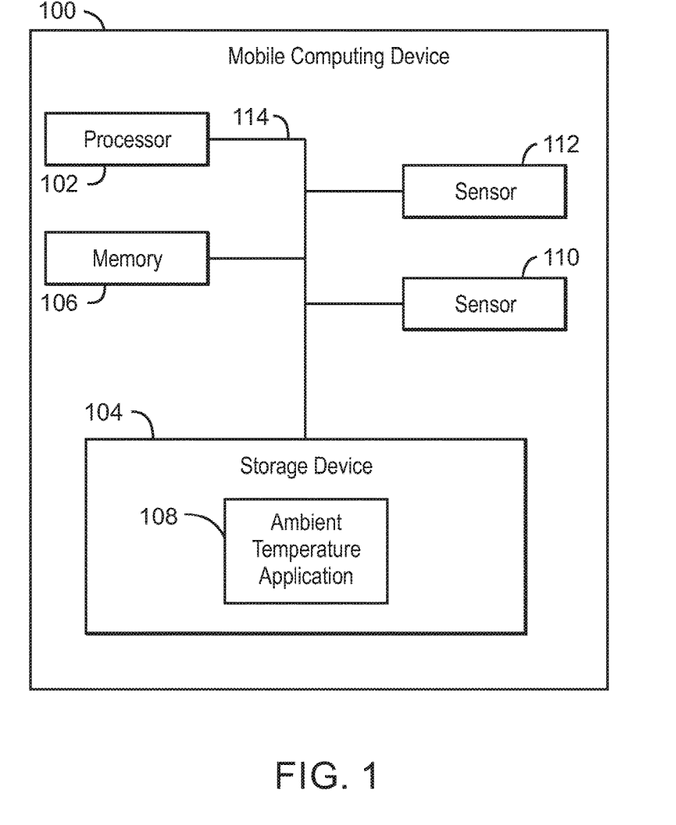
FIG. 1 is a block diagram of a computing device having logic to estimate ambient temperature.

FIG. 1 is a block diagram of a computing device having logic to estimate ambient temperature. The computing device 100 may include a processor 102, a storage device 104 comprising a non-transitory computer-readable medium, and a memory device 106. The computing device 100 may include an ambient temperature application 108 configured to receive temperature data from a first sensor 110 and a second sensor 112.

The ambient temperature application 108 may be logic, at least partially comprising hardware logic. In some embodiments, the ambient temperature application 108 is a set of instructions stored on the storage device 104, that when executed by the processor 102, direct the computing device 100 to perform operations including receiving first temperature data from the first sensor 110 of the computing device 100, and receiving second temperature data from the second sensor 112 of the computing device 100. The ambient temperature application 108 may estimate ambient temperature of an environment external to the computing device based on the first temperature data in relation to the second temperature data.

The first sensor 110 and the second sensor 112 may be thermistors, wherein a resistance associated with the first sensor 110 and resistance associated with the second sensor 112 varies with temperature. As discussed in more detail below, the second sensor 112 may be disposed in an area of the computing device 100 that generates more heat than an area in which the first sensor 110 is disposed. The difference between the temperatures detected at each sensor may be used to determine the ambient temperature external to the computing device 100.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (RAM), such as static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), flash memory, or any other suitable memory systems. The main processor 102 may be connected through a system bus 114 (e.g., Peripheral Component Interconnect (PCI), Industry Standard Architecture (ISA), PCI-Express, HyperTransport®, NuBus, etc.) to components including the memory 106, the storage device 104, and the sensors 110, 112.

The block diagram of FIG. 1 is not intended to indicate that the computing device 100 is to include all of the components shown in FIG. 1. The computing device 100 may include any number of additional components not shown in FIG. 1, depending on the details of the specific implementation. Further, the arrangement of various components illustrated in FIG. 1 is not necessarily representative of an arrangement of the present techniques.

Figure 2:
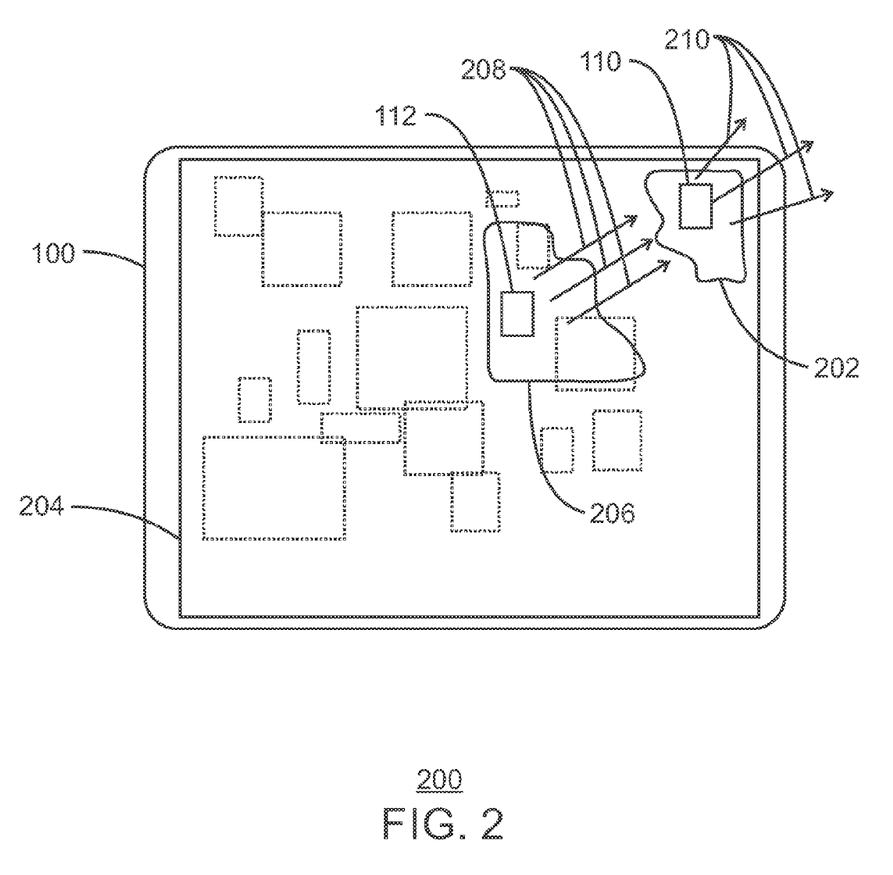
FIG. 2 is a block diagram of an example computing device having a first sensor and a second sensor.

FIG. 2 is a diagram illustrating a computing device having a first sensor and a second sensor. The computing device 100 includes the first sensor 110 and the second sensor 112. The first sensor 110 may be disposed in an area 202 of a printed circuit board 204 of the computing device 100 that generates less heat than an area 206 within which the second sensor 112 is disposed. In some scenarios, the largest amount of heat received at the first sensor 110 originates from the area 206, as indicated by the arrows 208. The heat received from the area 206 is then released by a heat transfer mechanism, such as conduction, convection, and/or radiation, into an external environment within which the computing device 100 is located, as indicated by the arrows 210.

The area 202 is relatively isolated in terms of heat generation in comparison to the area 206. In some embodiments, the area 202 generates less heat than area 206. In embodiments, the first sensor 110 disposed in the area 202 primarily detects heat provided from the second area 206 and heat associated with the external environment, or, in other words, the ambient temperature of the environment.

Temperature data of the first sensor 110 may be related to the temperature data of the second sensor 112, as indicated by Equation 1 below.

$$\frac{k_{board} A_{cx\ board\ 110-112}}{L_{110-112}} (T_{112} - T_{110}) + E_{generated} = \frac{(T_{110} - T_{ambient})}{R_{ext,110}} + (T_{110} - T_{110i}) m_{area} C_p \quad \text{Eq. 1}$$

In Eq. 1, $k_{board}$ is the thermal conductivity of the printed circuit board 204. In some scenarios, the thermal conductively may vary locally such that the thermal conductivity is not the same for the entire printed circuit board 204. In this scenario, $k_{board}$ is the thermal conductively of the printed circuit board 204 in the area inhabiting both the first sensor 110 and the second sensor 112. The variable $A_{cx\ board\ 110-112}$ is the cross sectional area of the board between the first sensor 110 and the second sensor 112, $L_{110-112}$ is the distance from the first sensor 110 to the second sensor 112, $T_{112}$ is the temperature at the second sensor 112, and $T_{110}$ is the temperature at the first sensor 110. $E_{generated}$ is the energy generated in the region of the first temperature sensor 110. On the right hand side of the equation, $T_{ambient}$ is the ambient temperature, $R_{ext,110}$ is the thermal resistance from the first sensor 110 to the external environment, $T_{110i}$ is the initial temperature at the first sensor 110, $m_{area}$ is the mass of the area 202 of the circuit board 204, and $C_p$ is the specific heat for the area 202.

As the first sensor 110 is disposed in the area 202 which generates significantly less heat than in the area 206, $E_{generated}$ may be assumed to be zero. Further, in some scenarios the change in temperature, $T_{110}$, at the first sensor 110 from an initial temperature, $T_{110i}$, can be ignored, and the temperature estimate will be based on a steady state condition. Therefore, for simplified embodiments, the term $(T_1 - T_{1i}) m_{area} C_p$ may be assumed to be zero. The remaining equation is indicated by Equation 2 below.

$$\frac{k_{board} A_{cx\ board\ 1-2}}{L_{1-2}} (T_2 - T_1) = \frac{(T_1 - T_{ambient})}{R_{ext,1}} \quad \text{Eq. 2}$$

Some of the variables together may be considered a constant. For example, the thermal conductivity, the cross sectional area between first sensor 110 and the second sensor 112, the distance from the first sensor to the second sensor, and the thermal resistance may be designated a constant "C," as indicated by Equation 3 below:

$$C = \frac{k_{board} A_{cx\ board\ 110-112}}{L_{110-112}} R_{ext,110} \quad \text{Eq. 3}$$

Solving Eq. 2 for $T_{ambient}$ provides Equation 4:

$$T_{ambient} = T_{110} - C(T_{112} - T_{110}) \quad \text{Eq. 4}$$

In some scenarios, the values in the constant "C" may be determined by a manufacturer of the computing device 100. For example, by solving Eq. 4 for the constant "C" in a controlled environment where $T_{ambient}$, $T_{110}$ and $T_{112}$ are known, the value of C may be preprogrammed into logic, such as firmware, of the computing device 100, and may be used to determined ambient temperature during operation of the computing device 100. Other scenarios for solving for the constant "C" may be implemented. For example, possible ways to determine the constant "C" include creating a thermal model of the operation of the device or to operate the device experimentally.

In some scenarios, the change in temperature, $T_{110}$, at the first sensor 110 from an initial temperature, $T_{110i}$ in Eq. 1 may be utilized for more accuracy to determine the ambient temperature. In this scenario, a second constant, "C2" may be set equal to the mass, "$m_{area}$" of the area 202, the specific heat, $C_p$ of the area 202, and the thermal resistance $R_{ext,110}$, as indicated by Equation 5.

$$C2 = m_{area} C_p R_{ext,110} \quad \text{Eq. 5}$$

In this scenario, the ambient temperature may be found by Equation 6.

$$T_{ambient} = T_{110} - C(T_{112} - T_{110}) + C2(T_{110} - T_{110\ Historical}) \quad \text{Eq. 6}$$

In some scenarios, the values in the constant "C2" may be determined by a manufacturer of the computing device 100, as discussed above in reference to the constant "C." In Equation 6, $T_{110\ Historical}$ may be a previous temperature at the first sensor 110. In some embodiments, $T_{110\ Historical}$ is an average of historical values, or rolling average of historical values of the temperature at the first sensor 110.

Although FIG. 1 and FIG. 2 have been described as including two sensors, more sensors may be used. In some cases, the constant "C" is a first constant, estimating ambient temperatures may include applying additional constants to the differences between temperatures from any combination of sensors included in various portions of the computing device 100.

Figure 3:
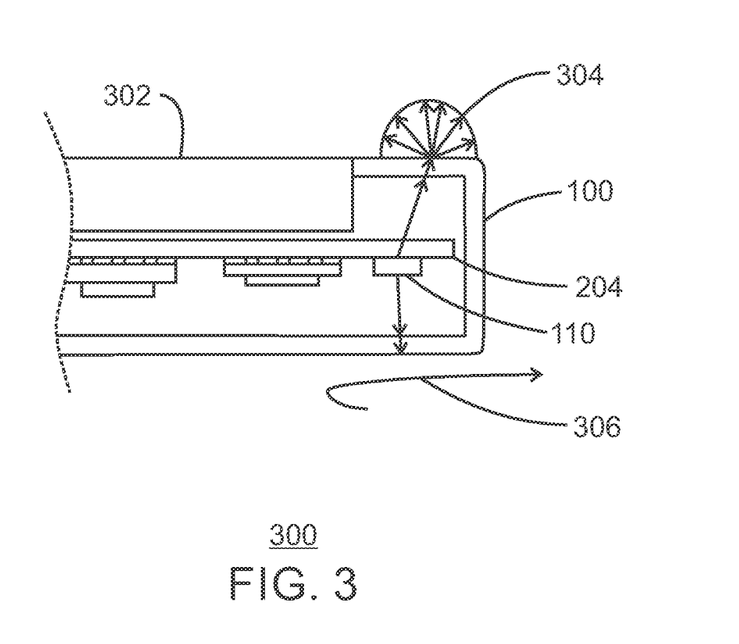
FIG. 3 is a diagram illustrating a cross sectional view of a portion of a computing device having a sensor disposed near an edge of the computing device.

FIG. 3 is a diagram illustrating a cross sectional view of a portion of a computing device having a sensor disposed near an edge of the computing device. The portion 300 of the computing device 100 includes the first sensor 110. The first sensor 110 is disposed at an edge of the printed circuit board 204. The first sensor 110 is disposed such that a display 302 does not directly heat area 202 (not illustrated; see FIG. 2 of the circuit board 204. Other types of heat dissipation may occur, such as by convection illustrated at 306. It is noted that the specific locations of the convection 306 and the radiation 304, are not meant to be limiting locations in view of the techniques described herein, but for illustration purposes only.

Figure 4:
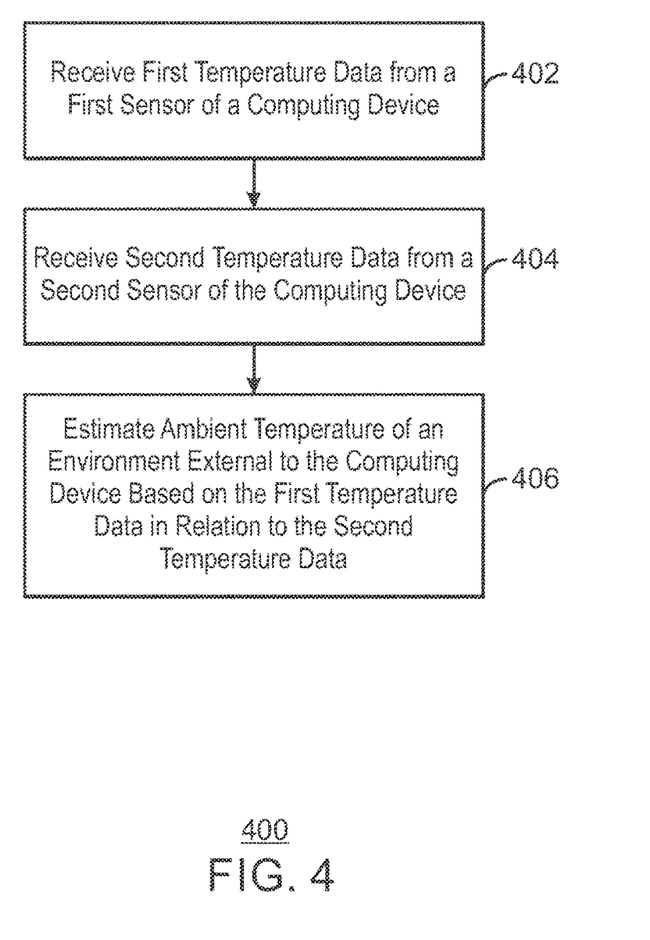
FIG. 4 is a block diagram illustrating a method for estimating ambient temperature.

FIG. 4 is a block diagram illustrating a method for estimating ambient temperature. At block 402, first temperature data is received from a first sensor of a computing device. The first temperature data may be received at a processing device, such as the processing device 102 of FIG. 1, at the direction of the ambient temperature application 108. At block 404, second temperature data is received from a second sensor of the computing device. At block 406, the ambient temperature of an environment external to the computing device is estimated based on the first temperature data in relation to the second temperature data.

In embodiments, the first sensor is disposed in an area, such as the area 202 of FIG. 2, generating less heat during operation of the computing device than an area in which the second sensor is disposed. Estimating the ambient temperature includes relating the first temperature data to a constant applied to a difference between the second temperature data and the first temperature data. The constant may be a function of factors including a thermal conductivity of a circuit board disposing the first sensor and the second sensor, a cross sectional area of the circuit board between the first sensor and the second sensor, a thermal resistance from the first sensor to the external environment, and a distance between the first sensor and the second sensor.

In some embodiments, the constant is a first constant. In this scenario, the method 400 may include incorporating a second constant to the difference between the first temperature data and a historical average of temperature data from the first sensor. The second constant may be a function of the mass of an area of a circuit board on which the first sensor is disposed, a specific heat of the area, and a thermal resistance from the first sensor to the external environment.

In some embodiments, the method 400 may include adjusting a maximum operating temperature of the computing device based on the estimated ambient temperature. For example, if the computing device is operating in an external environment having an ambient temperature of 25 degrees Celsius, the maximum operating temperature may be set to 35 degrees Celsius. As another example, if the computing device is operating in an external environment having an ambient temperature of 35 degrees Celsius, the maximum operating temperature may be set to 45 degrees Celsius.

Figure 5:
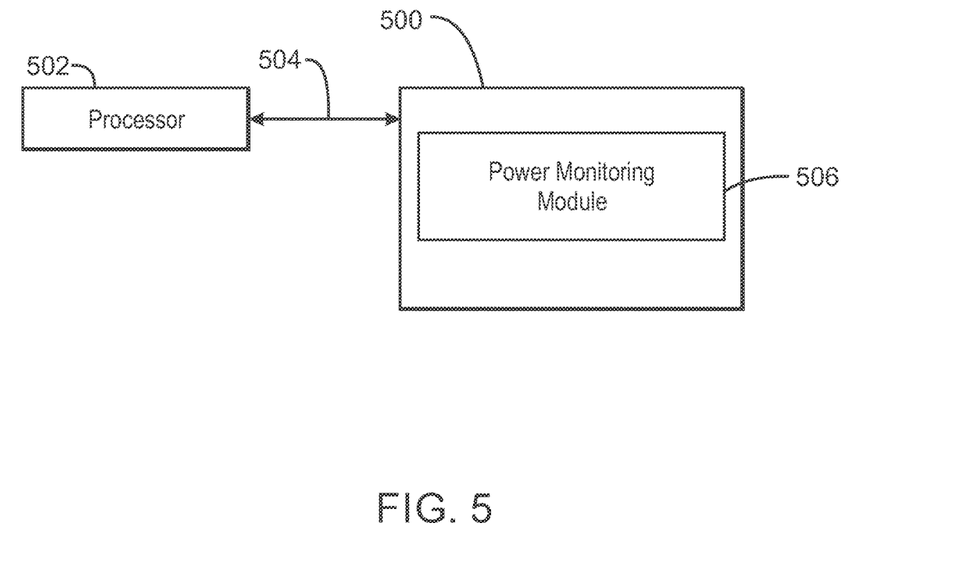
FIG. 5 is a block diagram depicting an example of a tangible, non-transitory computer-readable medium configured to estimate ambient temperature.

FIG. 5 is a block diagram depicting an example of a tangible, non-transitory computer-readable medium configured to estimate ambient temperature. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a power monitoring module 506 may be configured to receive first temperature data from the first sensor of a computing device, receive second temperature data from the second sensor of the computing device and estimate ambient temperature of an environment external to the computing device based on the first temperature data in relation to the second temperature data.

EXAMPLE 1

A method for estimating ambient temperature is described herein. The method includes receiving first temperature data from a first sensor of a computing device. A second temperature data can be received from a second sensor of the computing device. The second sensor data and first sensor data may be compared in order to estimate the ambient temperature of an external environment to the computing device.

EXAMPLE 2

A means for estimating ambient temperature is described herein. The means includes a first sensor and a second sensor, as well as logic to receive first temperature data from a first sensor of a computing device. A second temperature data can be received from a second sensor of the computing device. The second sensor data and first sensor data may be compared in order to estimate the ambient temperature of an external environment to the computing device.

In some examples, the computing device is a sealed mobile computing device, such as a tablet computing device, a 2 in 1 computing device, and the like, wherein the computing device does not have an air inlet wherein ambient temperature can be measured. Instead, the logic may relate the difference between the first sensor data and the second sensor data to determine an estimate for the ambient temperature.

EXAMPLE 3

A computing device for estimating ambient temperature is described herein. The computing device includes a first sensor and a second sensor, as well as logic to receive first temperature data from a first sensor of a computing device. A second temperature data can be received from a second sensor of the computing device. The second sensor data and first sensor data may be compared in order to estimate the ambient temperature of an external environment to the computing device.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device, comprising logic, at least partially comprising hardware logic, to:
   receive first temperature data from a first sensor of the computing device;
   receive second temperature data from a second sensor of the computing device;
   estimate ambient temperature of an environment external to the computing device based on the first temperature data in relation to the second temperature data, wherein the computing device is sealed without an airflow and the computing device lacks an air inlet to measure ambient temperature; and
   adjust a maximum operating temperature of the device based on the ambient temperature.

2. The computing device of claim 1, wherein the first sensor is disposed in an area of the computing device generating less heat during operation of the computing device than an area in which the second sensor is disposed.

3. The computing device of claim 1, wherein estimating ambient temperature comprises relating the first temperature data to the constant applied to a difference between the second temperature data and the first temperature data.

4. The computing device of claim 1, wherein the constant is a function of factors comprising:
   a thermal conductivity of a circuit board disposing the first sensor and the second sensor;
   a cross sectional area of the circuit board between the first sensor and the second sensor;
   a thermal resistance from the first sensor to the external environment; and
   a distance between the first sensor and the second sensor.

5. The computing device of claim 1, wherein the constant is a first constant, wherein estimating ambient temperature further comprises applying additional constants to the differences between temperatures from additional sensors.

6. The computing device of claim 1, wherein the constant is a first constant, wherein estimating ambient temperature further comprises incorporating a second constant to the difference between the first temperature data and a historical average of temperature data from the first sensor.

7. The computing device of claim 1, wherein the logic is to adjust a maximum operating temperature of the computing device based on the estimated ambient temperature.

8. A system, comprising:
   a first sensor;
   a second sensor;
   logic, at least partially comprising hardware logic, to:
      receive first temperature data from the first sensor of a computing device;
      receive second temperature data from the second sensor of the computing device;
      estimate ambient temperature of an environment external to the computing device based on the first temperature data in relation to the second temperature data, wherein the system is sealed without an airflow and the computing device lacks an air inlet to measure ambient temperature; and
      adjust a maximum operating temperature of the device based on the ambient temperature.

9. The system of claim 8, wherein the first sensor is disposed in an area of the computing device generating less heat during operation of the computing device than an area in which the second sensor is disposed.

10. The system of claim 8, wherein estimating ambient temperature comprises relating the first temperature data to a constant applied to a difference between the second temperature data and the first temperature data.

11. The system of claim 10, wherein the constant is a function of factors comprising:
   a thermal conductivity of a circuit board disposing the first sensor and the second sensor;
   a cross sectional area of the circuit board between the first sensor and the second sensor;
   a thermal resistance from the first sensor to the external environment; and
   a distance between the first sensor and the second sensor.

12. The system of claim 10, wherein the constant is a first constant, wherein estimating ambient temperature further comprises applying additional constants to the differences between temperatures from additional sensors.

13. The system of claim 10, wherein the constant is a first constant, wherein estimating ambient temperature further comprises incorporating a second constant to the difference between the first temperature data and a historical average of temperature data from the first sensor.

14. The system of claim 8, wherein the logic is to adjust a maximum operating temperature of the computing device based on the estimated ambient temperature.

15. A non-transitory computer readable medium including code, when executed, to cause a processing device to carry out operations, the operations comprising:
   receiving first temperature data from a first sensor of a computing device;
   receiving second temperature data from a second sensor of the computing device;
   estimating ambient temperature of an environment external to the computing device based on the first temperature data in relation to the second temperature data, wherein the computing device is sealed without an airflow and the computing device lacks an air inlet to measure ambient temperature; and
   adjusting a maximum operating temperature of the device based on the ambient temperature.

16. The computer readable medium of claim 15, wherein the first sensor is disposed in an area of the computing device generating less heat during operation of the computing device than an area in which the second sensor is disposed.

17. The computer readable medium of claim 15, wherein estimating ambient temperature comprises relating the first temperature data to the constant applied to a difference between the second temperature data and the first temperature data.

18. The computer readable medium of claim 15, wherein the constant is a function of factors comprising:
   a thermal conductivity of a circuit board disposing the first sensor and the second sensor;
   a cross sectional area of the circuit board between the first sensor and the second sensor;
   a thermal resistance from the first sensor to the external environment; and
   a distance between the first sensor and the second sensor.

19. The computer readable medium of claim 15, wherein the constant is a first constant, wherein estimating ambient temperature further comprises applying additional constants to the differences between temperatures from additional sensors.

20. The computer readable medium of claim 15, wherein the constant is a first constant, wherein estimating ambient temperature further comprises incorporating a second constant to the difference between the first temperature data and a historical average of temperature data from the first sensor.

21. The computer readable medium of claim 15, the operations further comprising adjusting a maximum operating temperature of the computing device based on the estimated ambient temperature.

* * * * *